Feb. 15, 1949.　　　C. R. GUTH　　　2,461,731
PREHEATING LIQUID FUEL TORCH
Filed June 6, 1945　　　2 Sheets-Sheet 1
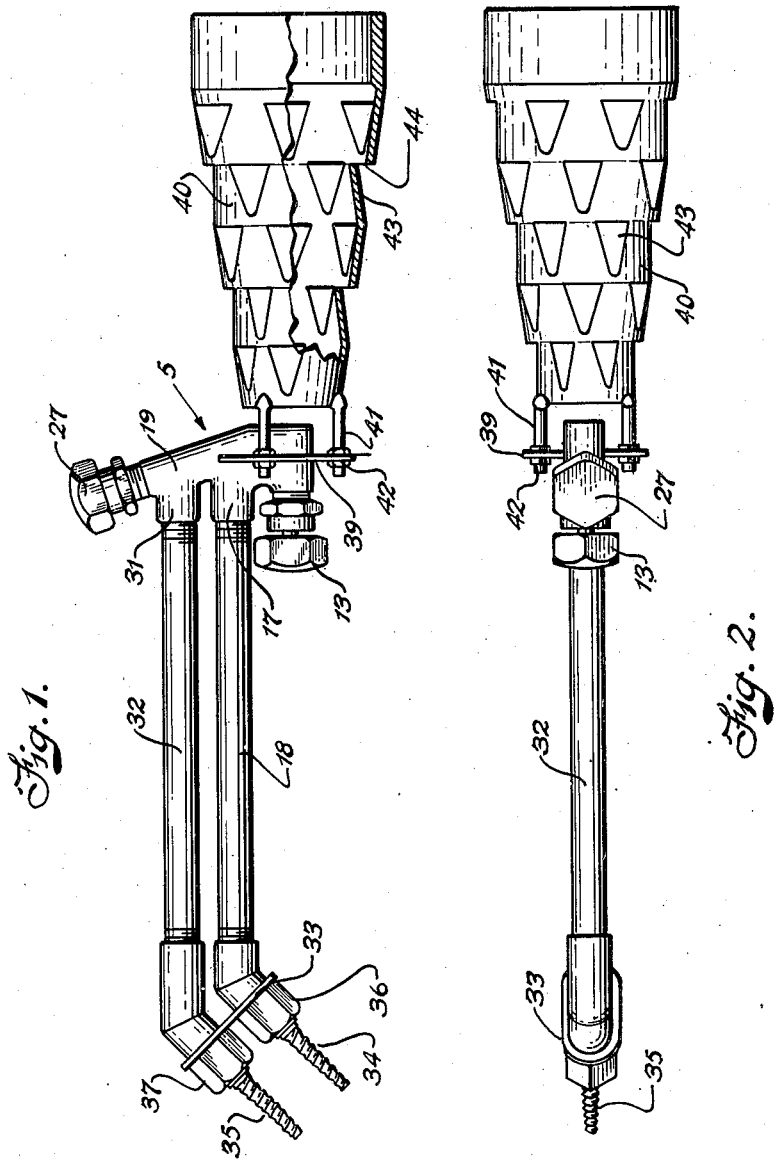
Inventor
Carl R. Guth.
By Clarence A. O'Brien
and Harvey B. Jacobson
Attorneys

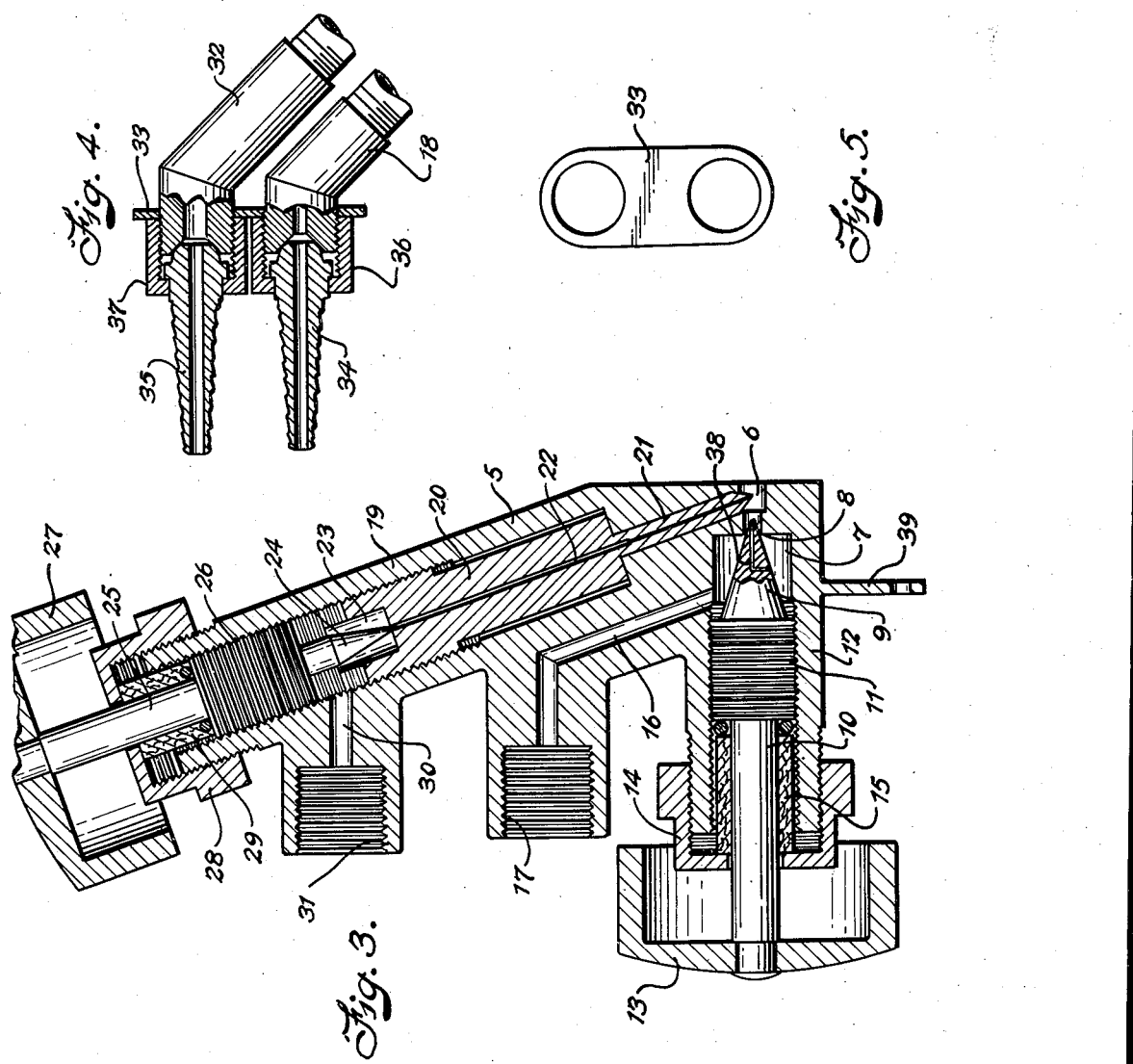

UNITED STATES PATENT OFFICE 2,461,731

PREHEATING LIQUID FUEL TORCH

Carl R. Guth, McPherson, Kans.

Application June 6, 1945, Serial No. 597,792

3 Claims. (Cl. 158—27.4)

The present invention relates to new and useful improvements in torches designed for preheating work to be welded and adapted for using liquid fuel mixed with compressed air delivered at a predetermined pressure and the invention has for its primary object to provide a discharge nozzle for the air and fuel together with individual control valves for regulating the mixture of the air and fuel.

An important object of the present invention is to provide a control valve of this character for regulating the resultant flame whereby a relatively small concentrated flame may be provided for heating small areas, or for providing a small low flame for heating the work slowly, or for providing a relatively large blasting flame for fast heating purposes, or for providing a relatively large soft enveloping flame for heating large parts, or in which any combination of such flame between their extremes may be provided.

A still further object of the invention is to provide a built in idling jet for the air valve.

Another object of the invention is to provide a flared shield in advance of the nozzle having louvers in the sides thereof providing air vents for the shield.

A still further object is to provide an apparatus of this character of simple and practical construction, which is efficient and reliable in use, relatively inexpensive to manufacture and otherwise well adapted for the purposes for which the same is intended.

Other objects and advantages reside in the details of construction and operation as more fully hereinafter described and claimed, reference being had to the accompanying drawings forming part hereof, wherein like numerals refer to like parts throughout, and in which:

Figure 1 is a side elevational view.

Figure 2 is a top plan view.

Figure 3 is an enlarged sectional view of the nozzle and control valve therefor.

Figure 4 is an enlarged sectional view of the air and fuel hose nipples for the rear end of the nozzle.

Figure 5 is a view in elevation of the connector for the pipes leading to the rear of the nozzle.

Referring now to the drawings in detail wherein for the purpose of illustration I have disclosed a preferred embodiment of the invention the numeral 5 designates the body of the nozzle for the pre-heating torch having a discharge opening 6 at its lower front edge behind which is an enlarged chamber 7 communicating with the discharge port, the rear end of the discharge port forming a valve seat designated at 8.

A conical valve 9 is movable into and out of engagement with the valve seat 8, the rear end of the valve being formed with a stem 10 having a threaded portion 11 immediately behind the conical valve 9 and threaded in a tubular extension 12 projecting rearwardly from the body of the nozzle behind chamber 7.

The stem 10 projects rearwardly beyond the tubular extension 12 and is formed or provided with a manipulating head 13.

A packing nut 14 is threaded on the rear end of the tubular extension 12 for securing packing 15 in position behind the threaded portion 11 of the stem.

A passage 16 communicates with the chamber 7 forwardly of the threaded portion 11 of the valve stem, the passage terminating in a threaded opening 17 in which the inner end of an air pipe 18 is threadedly engaged.

The nozzle body 5 also includes an upwardly and rearwardly inclined tubular extension 19.

An elongated plug 20 is threaded in the tubular extension 19, the lower end of the plug having a reduced pointed extension 21 projecting into the discharge port 6 of the nozzle at one side thereof and forwardly of the valve 9.

A fuel passage 22 extends from the tip of the extension 21 longitudinally through the plug 20 and terminates in an enlarged chamber 23 at the upper end of the plug.

A conical valve 24 is positioned in the chamber 23 in spaced relation from the walls thereof and adapted to enter and close the rear end of the passage 22.

The valve 24 is provided with a valve stem 25 including a threaded portion 26 of increased diameter threaded in the upper end of the tubular extension 19 beyond the chamber 23. The upper end of the stem 25 is also provided with a manipulating head 27 and a packing nut 28 is threaded on the upper end of the tubular extension 19 for securing packing 29 in position for the stem 25.

A fuel passage 30 communicates with the chamber 23 and terminates in a threaded opening 31 in which the inner end of a fuel pipe 32 is threaded engaged. The outer ends of the air and fuel pipes 18, 32 are connected by a plate 33 to secure the same rigidly to each other. To the rear end of the air and fuel pipes 18 and 32 are attached hose nipples 34 and 35 respectively by means of nuts 36 and 37, the nipple 34 being adapted for attaching an air hose thereto leading to a suitable supply of air under pressure while the nipple 35 is adapted for attaching a fuel hose leading to a supply of fuel under pressure.

Accordingly air under pressure is fed to the chamber 7 for admission to the discharge port 6 under control of the valve 9 and liquid fuel, such as gasoline, kerosene, distillate, fuel oil or the like is admitted into the chamber 23 and fed through the passage 22 of the plug 20 to the discharge port 6 under control of the valve 24 for mixing with the air and is then ignited in any suitable manner to produce a desired flame at the discharge port of the nozzle.

A passage 38 is provided in the tip of the valve 9 communicating with the chamber 7 to form an idling jet when the valve 9 is closed. The purpose of the passage 38 is to provide a restricted air outlet when the valve 9 is closed whereby, under operation at low air pressure, such air will be discharged at a velocity sufficient to atomize the fuel.

The lower side of the body 5 of the nozzle is formed with a flange 39 to which a forwardly projecting shield 40 is attached by means of rods 41 projecting from the rear end of the shield, the rear ends of the rod 41 being threaded and secured to the flange 39 by nuts 42.

The shield 40 is open at each end with its rear end supported in spaced relation in front of the discharge port 6 of the nozzle and the front end of the shield flares as indicated in Figure 1 and 2 of the drawing.

The sides of the shield 40 are formed with inwardly struck tongues 43 to provide openings 44 at the front edges of the tongues to form air inlets for the sides of the shield.

From the foregoing it will be apparent that the valves 9 and 24 may be regulated to adjust the mixture of air and fuel discharged from the port 6 and to thus regulate the type of flame in accordance with the requirement.

It is believed the details of construction, operations and advantages of the device will be readily understood from the foregoing without further detailed explanation.

In view of the foregoing description taken in conjunction with the accompanying drawings it it believed that a clear understanding of the construction, operation and advantages of the device will be quite apparent to those skilled in this art. A more detailed description is accordingly deemed unnecessary.

It is to be understood, however, that even though there is herein shown and described a preferred embodiment of the invention the same is susceptible to certain changes fully comprehended by the spirit of the invention as herein described and the scope of the appended claims.

I claim:

1. A liquid fuel torch comprising a nozzle having a discharge port, an air chamber in the nozzle behind the discharge port, passage means in the nozzle communicating with the chamber and adapted for connection to a source of air under pressure, a valve controlling communication between the chamber and the discharge port, a tubular extension on the nozzle, a plug positioned in the extension having a reduced extension projecting into the discharge port in advance of the air chamber, said plug and reduced extension having a fuel passage therein, and means for feeding fuel to the fuel passage under manual control.

2. A liquid fuel torch comprising a nozzle having a discharge port, an air chamber in the nozzle behind the discharge port, passage means in the nozzle communicating with the chamber and adapted for connection to a source of air under pressure, a valve controlling communication between the chamber and the discharge port, a tubular extension on the nozzle, a plug positioned in the extension having a reduced extension projecting into the discharge port in advance of the air chamber, said plug and reduced extension having a fuel passage therein, a fuel chamber in the rear end of the plug communicating with the fuel passage of the plug, fuel passage means leading to the fuel chamber and adapted for connection with a source of fuel supply, and valve means between the fuel chamber and the fuel passage in the plug.

3. A liquid fuel torch comprising a nozzle having a discharge port, an air chamber in the nozzle behind the discharge port, passage means in the nozzle communicating with the chamber and adapted for connection to a source of air under pressure, a valve controlling communication between the chamber and the discharge port, by-pass air passage means in the end of the valve providing direct communication between the air chamber and the discharge port, a tubular extension on the nozzle, a plug positioned in the extension having a reduced extension projecting into the discharge port in advance of the air chamber, said plug and reduced extension having a fuel passage therein, and means for feeding fuel to the fuel passage under manual control.

CARL R. GUTH.

REFERENCES CITED

The following references are of record in the file of this patent:

UNITED STATES PATENTS

| Number | Name | Date |
|---|---|---|
| 957,143 | Butler | May 3, 1910 |
| 1,140,621 | Sheaffer | May 25, 1915 |
| 1,148,803 | Scheu | Aug. 3, 1915 |
| 1,208,341 | Loftus | Dec. 12, 1916 |
| 1,281,345 | Goldberger | Oct. 15, 1918 |
| 1,487,239 | Gaskin | Mar. 18, 1924 |
| 1,695,334 | Johnston | Dec. 18, 1928 |
| 1,964,898 | White | July 3, 1934 |
| 2,267,104 | Jacobsson | Dec. 23, 1941 |

FOREIGN PATENTS

| Number | Country | Date |
|---|---|---|
| 353 | Australia | June 30, 1926 |
| 39,628 | Sweden | Apr. 15, 1914 |
| 259,044 | Great Britain | Oct. 7, 1926 |
| 270,195 | Italy | Dec. 24, 1929 |
| 729,034 | France | Apr. 19, 1932 |